Dec. 19, 1933.  J. F. ALCOCK  1,940,236

CHANGE GEAR CONTROL MECHANISM

Filed April 22, 1933  2 Sheets-Sheet 1

INVENTOR.
J. F. Alcock
Per A. Millward Hack
his Attorney.

Dec. 19, 1933.    J. F. ALCOCK    1,940,236
CHANGE GEAR CONTROL MECHANISM
Filed April 22, 1933    2 Sheets-Sheet 2
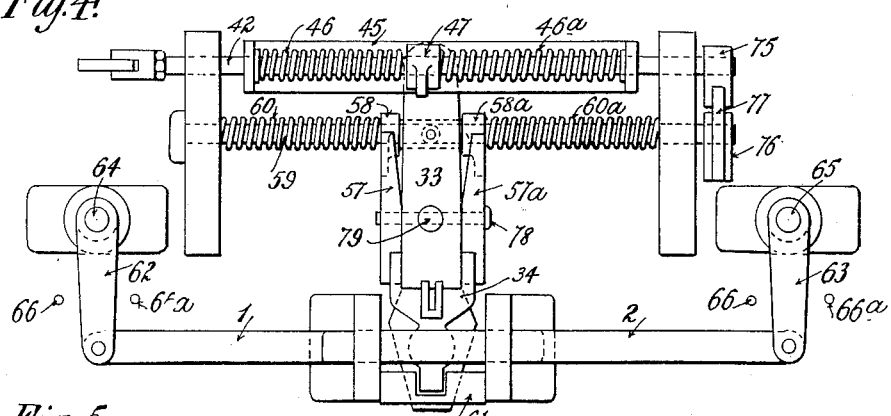
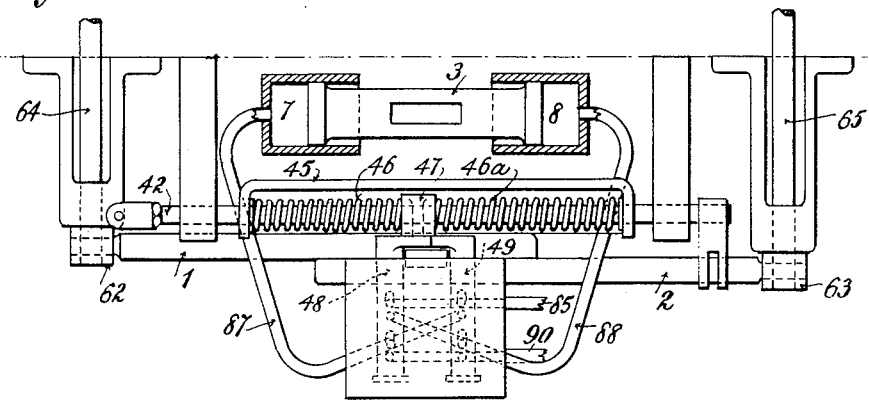
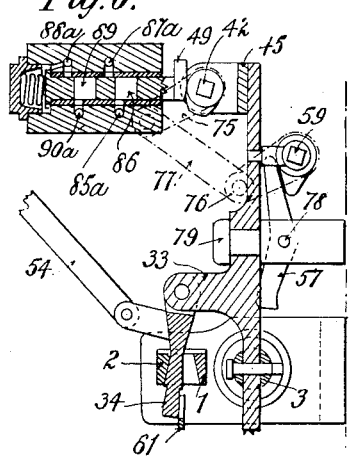
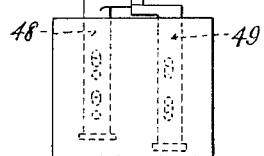
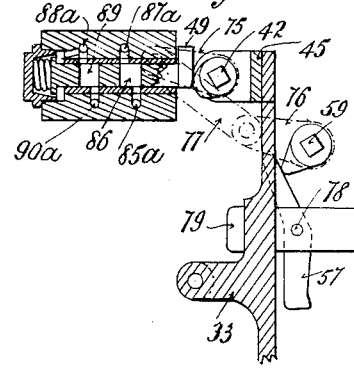
INVENTOR.
J.F.Alcock.
Per A. Milward Hack.
his Attorney.

Patented Dec. 19, 1933

1,940,236

UNITED STATES PATENT OFFICE 1,940,236

CHANGE GEAR CONTROL MECHANISM

John Fredrick Alcock, Roundhay, Leeds, England

Application April 22, 1933, Serial No. 667,492, and in Great Britain May 3, 1932

5 Claims. (Cl. 74—58)

This invention relates to improvements in change gear mechanism, more particularly to gear controlling change gear mechanism applied to geared locomotives, either of the steam, oil, or Diesel type, and is of particular value in connection with such mechanism when applied to articulated locomotives, or where a number of shafts have to be moved simultaneously.

The object of the present invention is to provide a pre-selective gear change arrangement incapable of effecting a change of gear until a definite movement is completed.

The present invention comprises a pneumatic or fluid change-speed gear control mechanism in which pre-selection is effected by a hand lever and changes are effected by depressing the engine clutch pedal or its equivalent and consists of movable shafts to effect a change of gear, another shaft, the ends of which are formed as pistons working in cylinders, distributing valves for placing said cylinders in communication with fluid pressure, a universally fulcrumed hand lever, the upper end of which works in a notch plate and the lower end is connected to a spring controlled rod controlling the valve to be opened and also connected to a spring controlled rod to select which of the change gear shafts is to be moved, a clutch on the engine shaft, means whereby the clutch is first disconnected from the engine shaft and then opens a valve to allow fluid under pressure to be transmitted to the selected distributing valve, and means whereby the said valve is kept fully opened until the clutch is engaged with the engine shaft.

Provision is made by employing a stop for preventing the gear change shafts being moved simultaneously, and means are provided for locking the gears in a neutral position and preventing them from overrunning the neutral position when changing gear.

The pressure of the fluid, air, oil, water or other fluid, may be generated as and when required, or the fluid under pressure may be stored in a reservoir or accumulator for use as required.

This invention will be now more particularly described making reference to the accompanying drawings in which:—

Fig. 4 is an enlarged detail view in front elevation of the valve selecting mechanism.

Fig. 5 is a view in plan of part of Fig. 4.

Fig. 6 is a detail view in sectional end elevation of Fig. 4, showing the mechanism with the selector or distributor valve as closed.

Fig. 7 is a similar view to Fig. 6, but showing the selector or distributor valve open, and Fig. 8 is a detail view in plan of the selector or distributor valves shown one in an open position, and the other closed.

Throughout the views similar parts are marked correspondingly.

Figure 1:
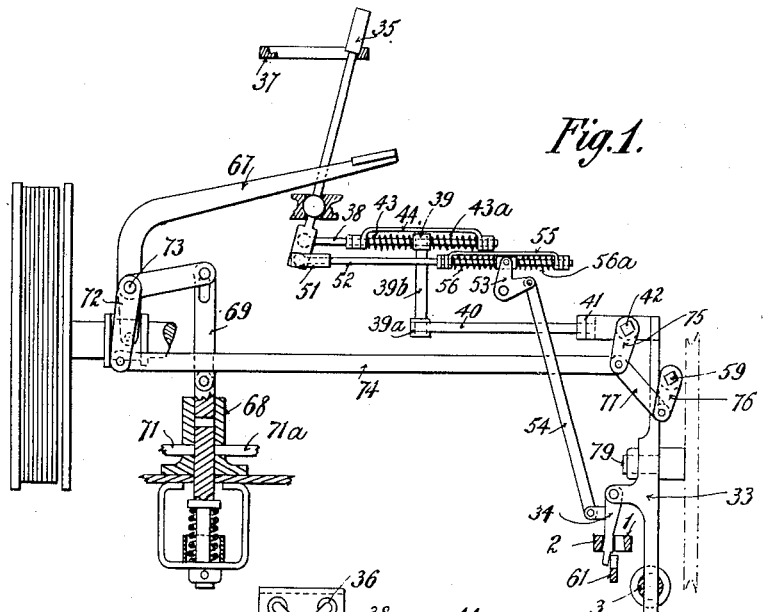
Fig. 1 is a view in side elevation of a gear control mechanism embodying the present invention.
Figure 2:
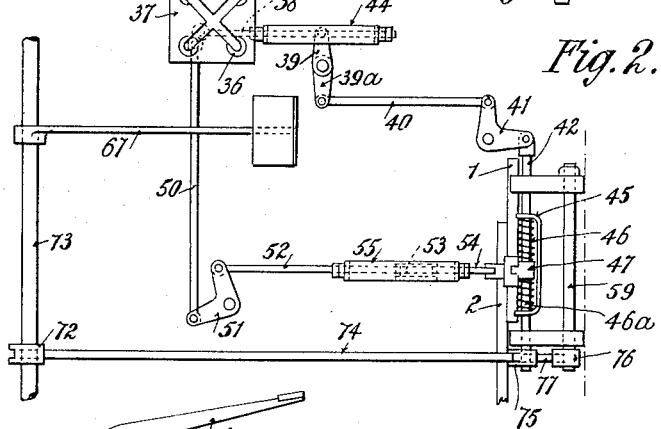
Fig. 2 is a view in plan thereof.
Figure 3:
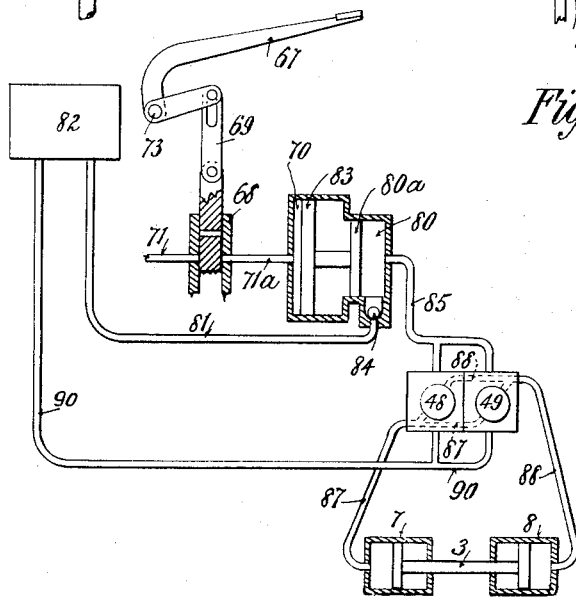
Fig. 3 is a diagrammatic view showing the fluid pressure operating system employed with said mechanism.

Shafts 1 and 2 operating the gear change are moved in an axial direction to effect the desired change of speed or direction, by means of fluid pressure on the end of another shaft 3 (see Figs. 3 and 5), the ends of which are made in the form of pistons and adapted to work in cylinders 7 and 8, the motion being transmitted by lever 33 and a depending hinged gate lever 34 (see more particularly Figs. 1, 4-7). The gear change is pre-selected by moving a change gear lever 35, so fulcrumed as to allow of universal motion, into the required notch 36 of a notch plate 37. The change gear lever 35 produces two distinct movements simultaneously. The first movement is to select the required valve to be opened by pulling or pushing a rod 38 which is connected to the lower end of the lever 35. The motion of the rod 38 is transmitted to a valve selecting shaft 42, by levers 39, 39a, rod 40, and bell crank lever 41. The lever 39 is slidably attached to the rod 38, and the movement of the rod 39b is controlled by springs 43, 43a, arranged on each side of the sliding attachment of the rod 38, the said springs being carried in a cage 44 fixed on the rod 38. A cam 47 may be fixed to the shaft 42 and its movement controlled by springs 46, 46a, bearing on each side of the cam 47 and on the ends of the cage 45 through which the shaft 42 slides, or alternatively, the cam may be made to slide axially on the shaft 42 and its movement being controlled by springs 46, 46a, bearing on each side of the cam 47 and with their other ends fixed to the shaft 42 which slides through the cage 45. A clearance to be left between the ends of the springs 46, 46a, and the ends of the cage 45 to allow a pre-determined travel of the cage before the spring is brought into contact with the cage 45. In the former arrangement the travel of the cam 47 is pre-determined by the ratio of the strength of the springs 43, 43a, and 46 and 46a. In the alternative arrangement the movement of the cam is determined by the clearance between the ends of the springs 46 and 46a, and the ends of the cage 45, the springs 46 and 46a being used to keep the cam 47 central, and allow the shaft 42 to move whilst the cam is being held back by the valve 48 or 49 as shown in Fig. 8. The cage 45 is attached to the end of the lever 33. When the shaft 42 is moved axially the cam 47 is brought opposite either a distributing valve 48 or a distributing valve 49 which operate the gear change.

The second movement caused by moving the change gear lever 35, is to select which of the shafts 1 or 2 is to be moved, this movement is transmitted by a rod 50, bell crank lever 51, rod 52, bell crank lever 53, and rod 54 to the gate lever 34. The bell crank lever 53 is slidably attached to the rod 52 and the movement is controlled by springs 56, 56a, arranged on each side of the sliding attachment of the lever 53, the said spring being carried in a cage 55 fixed on the rod 52. The gate lever 34 is prevented from moving both shafts 1 and 2 simultaneously by the stop 61 (see Figs. 4 and 6) which does not permit movement axially until the gate lever 34 is in contact with shaft 1 or 2 only, a compression in spring 56 or 56a, taking place until the gate lever 34 is full over.

The gears are locked in neutral position and are also prevented from overrunning the neutral position when changing gears by kickers 57 and 57a which act as stops, see Figs. 4, 6 and 7. Each of the kickers 57, 57a, is operated by a cam 58 or 58a (see Fig. 4) on a shaft 59, having springs 60 and 60a, for allowing the cams to be moved along the shaft 59 when the lever 33 is moved to one side or the other. When the lever 33 is moved to one side, it pushes the cam 58 or 58a along the shaft 59 out of contact with the kicker 57 or 57a, and when the shaft 59 is rotated only one of the kickers is lifted, the other acting as a stop when neutral position is reached on the next gear change.

The necessary means of effecting the change of gear is produced by placing the cylinder 7 or 8 in communication with the fluid pressure by opening the distributing valves 48 or 49, thus causing the shaft 3 with lever 33 and gate lever 34 to be moved axially, and effecting gear change by moving the pre-selected shaft 1 or 2. The movement of shafts 1 and 2 (see Figs. 4 and 5) may be transmitted by cranks 62 and 63 to shafts 64 and 65 respectively for operating gear change by a turning movement. Stops 66 and 66a may be provided to limit the movement of the shafts 1 and 2. The gear change may be operated by hand or by a clutch pedal 67.

When it is desired to effect a change of gear, the clutch pedal 67 is depressed, thus disconnecting the clutch from the engine shaft, and when a pre-determined travel of the pedal has taken place, a fluid valve 68 is opened by a slotted link 69, connected to the pedal 67, and puts a cylinder 70 in communication with fluid pressure in a pipe 71, which may be taken from any source of pressure.

A pipe 71a connects the valve 68 to a cylinder 70. As the clutch pedal 67 is being depressed, a lever 72, which is fixed on the pedal shaft 73, pulls a rod 74 which is attached to a lever 75 and to a lever 76 by another rod 77, and thus rotates the valve selecting shaft 42, and the kicker cam shaft 59. This movement causes the cam 47 to open the selected valve 48 or 49, and at the same time the cams 58 and 58a turn the kickers 57 and 57a about their pivot 78, to allow the lever 33 to be moved to one side or the other about its pivot 79.

A cylinder 80 is made in one with the cylinder 70 and is provided with a piston 80a which is connected to the piston 83. The cylinder 80 is filled with fluid, through a non-return valve 84 from a tank 82 by means of a pipe 81, and upon the piston 83 being pushed forward, the ball valve 84 is closed thus creating the necessary pressure in the cylinder 80. This pressure is transmitted along pipe 85 to the distributing valves 48 and 49 where the selected valve has been opened. The pressure is then communicated to the cylinder, for example cylinder 7, by means of suitably placed ports 85a and 87a in the cylinder and port 86 in the valve and along pipe 87. The pressure in the cylinder 7 moves the shaft 3 in an axial direction and with it the levers 33 and 34 which move the shaft 1 or 2 which ever has been selected. The fluid displaced from the cylinder 8 is forced along pipe 88, through ports 88a and 90a in the cylinder and port 89 in the valve along pipe 90 to the tank 82. The shaft 1 would thus operate the gear changes of shaft 64, and shaft 2 would operate the gear changes of shaft 65.

When the valve 49 is opened allowing pressure to pass to cylinder 7 and thus move lever 33 across the cam 47 tends to move with the cage 45 which is attached to lever 33. The cam 47 is prevented from moving across by the end of the valve 48, (see Fig. 8) and the cam 47 can only move across when the pressure is released from the clutch pedal. The distribution valve is therefore kept full open until the clutch is engaged with the engine shaft.

Though I have described with great particularity of detail one embodiment of my invention, yet it is not to be understood therefrom that the invention is restricted to the particular embodimen illustrated. Various modifications may be made in detail and in the arrangement of the parts without departing from the invention as defined by the following claims.

It will be understood that when it is necessary to pre-select and change gear with more than one set of gears simultaneously as required with an articulated type of locomotive, more than one cylinder is, by means of branch pipes, supplied with fluid under pressure.

I declare that what I claim and desire to secure by Letters Patent is:—

1. A pneumatic or fluid change-speed control mechanism in which pre-selection is effected by a hand lever and changes are effected by depressing the engine clutch pedal, comprising in combination, movable shafts connected to the change gear and axially movable to effect a change of speed, an axially movable shaft adapted to move either one of the change gear shafts, pistons formed on the ends of the axially movable shaft, a pair of aligned cylinders, one for each piston, distributing valves for placing said cylinders in communication with fluid pressure, a universally fulcrumed hand lever, a notch plate in which the upper end of the hand lever works, a spring controlled rod controlling the valve to be opened and connected to the lower end of the hand lever, a second spring controlled rod to select which of the change gear shafts is to be moved and also connected to the lower end of the hand lever, a clutch on the engine shaft and means for first disconnecting the clutch from the engine shaft and then allowing fluid pressure from any convenient source to be transmitted to the selected distributing valve until the clutch is engaged with the engine shaft, as set forth.

2. A pneumatic or fluid change-speed control mechanism in which pre-selection is effected by a hand lever and changes are effected by depressing the engine clutch pedal, comprising in combination, movable shafts connected to the change gear and axially movable to effect a change of speed, an axially movable shaft adapted to move either one of the change gear shafts, pistons formed on the ends of the axially movable shaft, a pair of aligned cylinders, one for each piston, distributing valves for placing said cylinders in communication with fluid pressure, a universally fulcrumed hand lever, a notch plate in which the upper end of the hand lever works, a spring controlled rod controlling the valve to be opened and connected to the lower end of the hand lever, a second spring controlled rod to select which of the change gear shafts is to be moved and also connected to the lower end of the hand lever, means for preventing the gear change shafts being moved simultaneously, a clutch on the engine shaft and means for first disconnecting the clutch from the engine shaft and then allowing fluid pressure from any convenient source to be transmitted to the selected distributing valve until the clutch is engaged with the engine shaft, as set forth.

3. A pneumatic or fluid change-speed control mechanism in which pre-selection is effected by a hand lever and changes are effected by depressing the engine clutch pedal, comprising in combination, movable shafts connected to the change gear and axially movable to effect a change of speed, an axially movable shaft adapted to move either one of the change gear shafts, pistons formed on the ends of the axially movable shaft, a pair of aligned cylinders, one for each piston, distributing valves for placing said cylinders in communication with fluid pressure, a universally fulcrumed hand lever, a notch plate in which the upper end of the hand lever works, a spring controlled rod controlling the valve to be opened and connected to the lower end of the hand lever, a second spring controlled rod to select which of the change gear shafts is to be moved and also connected to the lower end of the hand lever, means for locking the gears in a neutral position and preventing them from overrunning the neutral position when changing gears, a clutch on the engine shaft and means for first disconnecting the clutch from the engine shaft and then allowing fluid pressure from any convenient source to be transmitted to the selected distributing valve until the clutch is engaged with the engine shaft, as set forth.

4. A pneumatic or fluid change-speed control mechanism for an articulated type of locomotive in which pre-selection of the change gears with more than one set of gears is simultaneously effected by a hand lever and changes are effected by depressing the engine clutch pedal, comprising in combination, movable shafts connected to the change gears and axially movable to effect a change of speed, axially movable shafts adapted to move the selected change gear shafts, pistons formed on the ends of each axially movable shaft, pairs of aligned cylinders, one pair for each pair of pistons, distributing valves for placing said cylinders in communication with fluid pressure, a universally fulcrumed hand lever, a notch plate in which the upper end of the hand lever works, a set of spring controlled rods controlling the valves to be opened and connected to the lower end of the hand lever, a second set of spring controlled rods to select which of the change gear shafts are to be moved and also connected to the lower end of the hand lever, means for preventing the gear change shafts being moved simultaneously, means for locking the gears in a neutral position and preventing them from overrunning the neutral position when changing gears, a clutch on the engine shaft, and means for first disconnecting the clutch from the engine shaft and then allowing fluid pressure from any convenient source to be transmitted to the selected distributing valves until the clutch is engaged with the engine shaft, as set forth.

5. A pneumatic or fluid change-speed control mechanism in which pre-selection is effected by a hand lever and changes are effected by depressing the engine clutch pedal, comprising in combination, movable shafts connected to the change gear and axially movable to effect a change of speed, an axially movable shaft, pistons formed on the ends of the axially movable shaft, a pair of aligned cylinders, one for each piston, distributing valves for placing said cylinders in communication with fluid pressure, a pivoted lever, the one end of which engages the axial movable shaft, a gate lever hinged to said pivoted lever and adapted to engage either one of the change gear shafts, a universally fulcrumed hand lever, a notch plate in which the upper end of the hand lever works, a spring controlled rod connected to the lower end of said hand lever, a valve selecting shaft controlling the distributing valves, and connected with the spring controlled rod, a second spring controlled rod also connected to the lower end of the hand lever and connected to the gate lever to select which one of the gear shafts is to be moved, a stop to prevent the gate lever from moving both gear shafts simultaneously, a clutch on the engine shaft, a clutch pedal for disconnecting the clutch from the engine shaft, a fluid pressure reservoir, piping connecting said fluid pressure reservoir with the distributing valves of the cylinders, a valve controlling the fluid pressure flow from the reservoir and connection to the clutch pedal so that the valve is opened after a predetermined travel of the clutch pedal, and means for keeping the distribution valve fully open until the clutch is engaged with the engine shaft, as set forth.

JOHN FREDRICK ALCOCK.